(12) United States Patent
Kainen

(10) Patent No.: US 10,150,939 B2
(45) Date of Patent: Dec. 11, 2018

(54) LENTICULAR SOAP

(71) Applicant: Dan Kainen, New York, NY (US)

(72) Inventor: Dan Kainen, New York, NY (US)

(73) Assignee: Dan Kainen, New York, NY (US)

( * ) Notice: Subject to any disclaimer, the term of this patent is extended or adjusted under 35 U.S.C. 154(b) by 0 days.

(21) Appl. No.: 15/308,062

(22) PCT Filed: May 5, 2016

(86) PCT No.: PCT/US2016/030873
§ 371 (c)(1),
(2) Date: Oct. 31, 2016

(87) PCT Pub. No.: WO2016/179340
PCT Pub. Date: Nov. 10, 2016

(65) Prior Publication Data
US 2018/0044617 A1    Feb. 15, 2018

Related U.S. Application Data

(60) Provisional application No. 62/157,133, filed on May 5, 2015.

(51) Int. Cl.
| | | |
|---|---|---|
| G02B 27/10 | (2006.01) | |
| C11D 17/00 | (2006.01) | |
| G02B 27/22 | (2018.01) | |
| G03B 25/02 | (2006.01) | |
| G03B 35/24 | (2006.01) | |
| G02B 3/00 | (2006.01) | |

(52) U.S. Cl.
CPC .......... *C11D 17/0095* (2013.01); *G02B 3/005* (2013.01); *G02B 27/2214* (2013.01); *G03B 25/02* (2013.01); *G03B 35/24* (2013.01)

(58) Field of Classification Search
CPC ............... C11D 17/0095; G02B 3/005; G02B 27/2214; G03B 25/02; G03B 35/24; H04J 1/02
USPC .......................... 359/619, 620; 510/142, 147
See application file for complete search history.

(56) References Cited

U.S. PATENT DOCUMENTS

| | | | |
|---|---|---|---|
| 1,827,549 A | | 10/1931 | Villain |
| 5,869,437 A | * | 2/1999 | Wolfersberger ... C11D 17/0095 510/143 |

(Continued)

*Primary Examiner* — William Choi
(74) *Attorney, Agent, or Firm* — Lucas & Mercanti, LLP

(57) ABSTRACT

Method and apparatus for creating lenticular, or other types of images that change with respect to the angle from which images are viewed in a bar of soap, including a method of printing a lenticular, "fly's-eye" or other type of image onto either the soap itself, or on a non-toxic, food-safe, substrate with non-toxic, food-safe inks, or by projecting an image onto non-toxic, food-safe photo-sensitive emulsion layer within the soap, and creating a lenticular, or other type of lens array with a clear or sufficiently transparent soap material as to display lenticular or other integrated image properties, such as 3D, motion, flip, zoom, color change, morph, and others. Additionally, the lenticular array is located within the soap bar such that the soap will not destroy the image when first used, but only after a large portion or almost all of the soap is used up or consumed.

17 Claims, 4 Drawing Sheets

(56) References Cited

U.S. PATENT DOCUMENTS 6,184,191 B1 2/2001 Wolfersberger
2008/0277305 A1* 11/2008 Wille ................. C11D 17/0095
206/531

* cited by examiner

LENTICULAR SOAP

FIELD OF THE INVENTION

This invention relates to bar soap and especially decorative soap containing an image which can change or appear dimensional, depending on the angle from which a viewer sees it, and containing a lens which may be lenticular, or similar, integrated lens arrays, such as "fly's eye", or hexagonal arrays.

BACKGROUND OF THE INVENTION

Images on, and within soap are well known, as well as molding a logo into soap. Imbedding images in clear soap has been known as early as 1931 (Villain U.S. Pat. No. 1,827,549). More recently dissolving polymer material containing an image has been used (Wolfersberger U.S. Pat. No. 6,184,191 for Transparent Soap with Printed Logo). Many craft and hobby websites, such as Brambleberry.com give instructions how to imbed images on, and in soap, and sell clear soap base, for that purpose. Such sites also sell molds for casting soap in various shapes, and scents to relate to those shapes. Objects are also sometimes embedded in soap for advertising purposes or as an incentive for a child to use it. Food-safe printers and inks are also well known and used to print on water-soluble paper for soap and edible paper for images on cakes or cookies.

Decorative soap has long been used to advertise and reinforce not only its own brand, but others as well, such as in the hospitality industry, where small bars are given away in hotels with the logo of the hotel or hotel chain on the packaging or printed on, or molded into the soap itself. Decorative soaps are also used to create an incentive in children for using soap and enjoying their bath. An imbedded image can be made to last until the soap is used, or largely so, as in the aforementioned patents. Various soap-packaging arrangements offer lenticular images for soap, such as Wenzhou Chongkun Printing Co, Ltd., on mainland China, and ABC has held a "Super Soap Weekend", in which a pin was released that features a TV with a lenticular image inside of it that changes to reveal the names of different soaps. Such efforts at printing lenticular images on, or including them in, soap packaging has shown itself to be an important aid in marketing soap. However, once the package is opened, the soap itself is not as effective as a marketing tool. Therefore it would be highly desirable to be able to achieve as eye-catching as possible a display on or in the soap itself.

SUMMARY OF THE INVENTION

The present invention seeks to create a display within the soap itself that changes depending on the angle from which it is seen by the user. Because of the nature of such images, the display may be made to look three-dimensional, or display any of the other effects commonly associated with lens array techniques, such as morph, zoom, and animation.

DETAILED DESCRIPTION OF PREFERRED EMBODIMENTS

Figure 1:
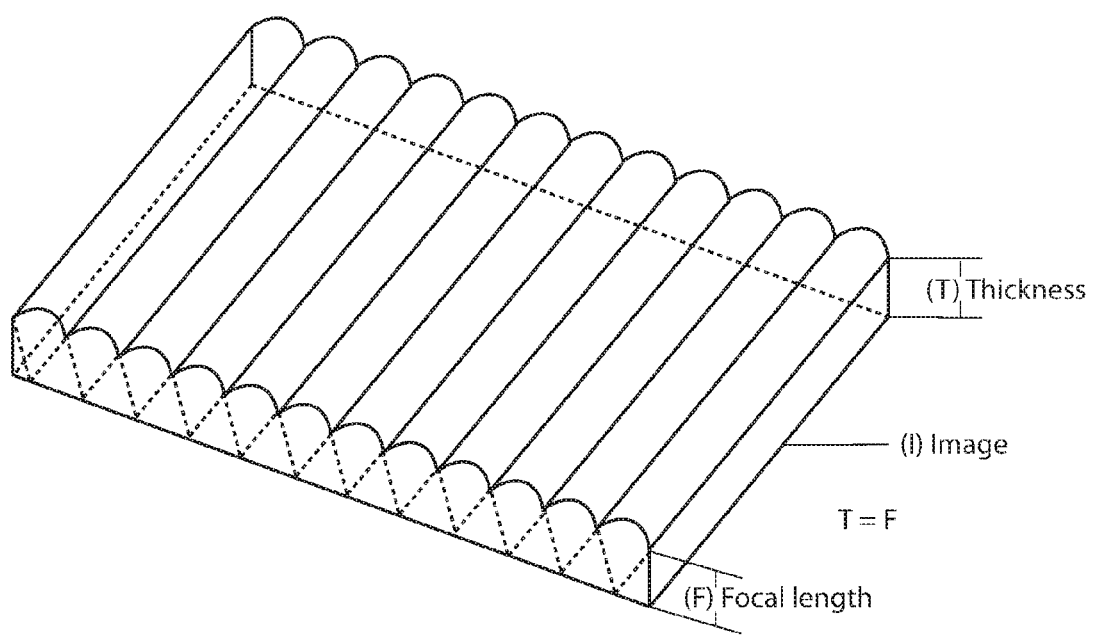
FIG. 1 shows bar of clear soap formed as lenticular lens sheet (ls), whose thickness (t) is the same as its focal length (f) with image (I) at its focal plane (f)
Figure 2:
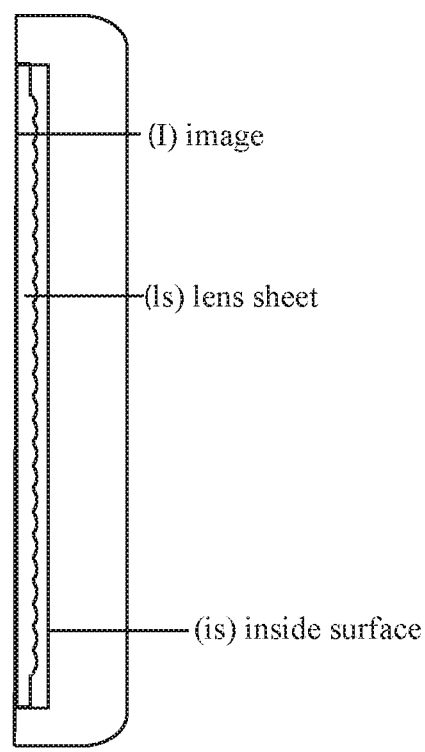
FIG. 2 shows soap lens sheet (ls) and image (I) from FIG. 1 embedded in a clear bar of soap (b), with an empty space (s) between the curved side of the lenses and the inside surface (is) of the bar.
Figure 3:
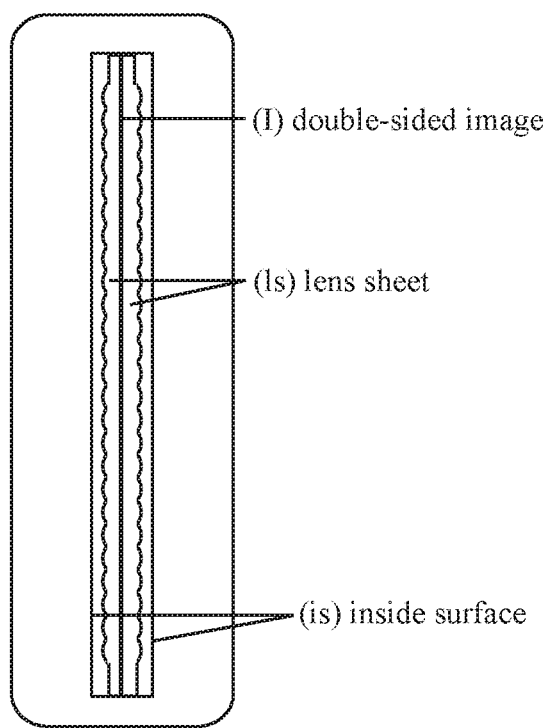
FIG. 3 shows soap lens sheet (ls) embedded in bar as in FIG. 1, but in a double-sided array.
Figure 4:
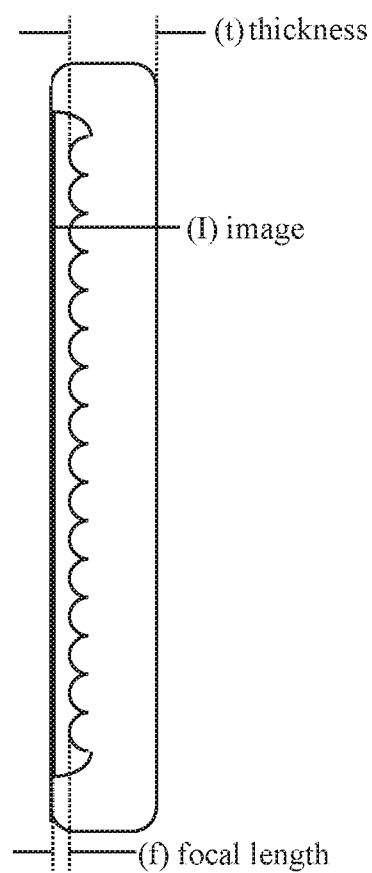
FIG. 4 shows a soap lens sheet whose thickness (t) is greater than its focal length (f), facing inward, separated from an image by an empty space the width of its focal plane, and with a surrounding perimeter of soap equal in thickness to (t).

Preferred embodiments will be disclosed, but the invention is not limited to these embodiments.

A clear soap is formed into a lens array at whose focal-length is adhered, printed, or photographically projected onto a sensitized material, either through the lenses or not, a food-safe image which corresponds in pitch to the lens array, so as to create any of the types of images generally associated with lenticular or fly's eye arrays. Three-dimensional, motion, morph, and zoom, are common examples. The soap is preferably of clear or transparent material, but can be partially transparent or translucent, such that the material permits at least some light to pass through the material. The image can be made using non-toxic or food-safe ink on a non-toxic substrate.

In a preferred embodiment, the image is located on the flat back of the lens array, whose thickness is the same as its focal-length. Two such lens arrays with images may be placed back-to-back and surrounded with a larger bar of clear soap, leaving an air space between the outer surface of the lenses and the rest of the bar so that the images remain visible from the outside of the bar, but are not damaged by using the soap until the outer layer is completely used up or consumed by a user.

In another preferred embodiment, the lens array may be thicker than its focal length, but face lens-side inwards, with the image disposed at an air-spaced distance from the array equaling its focal-length. Two such thick arrays might form the two sides of a rectangular bar of soap, with a flat piece between them, having an image on either side. This would enable seeing the image from outside, but not damaging the relationship between lens and image until the thickness of the arrays is completely used up or consumed. Additionally, since it is untouched, the image itself would not be subject to bleeding or blurring, even if made from a water-based, or otherwise soluble substance.

The above embodiments could be made in rectangular, or other shapes, including but not limited to cubes, other solid polygons, spheres, cylinders, and other both recognizable or abstract shapes.

When the soap is made, there is sometimes shrinkage during the process, and the image should preferably be added to the soap at the correct pitch to match the lens array. Shrinkage is quite predictable however, so if the time between creation of the soap into a solid form is accounted for, one may predict at what pitch the image needs to be made. For example, if the soap is molded into a lenticular screen at a pitch of 30 lenses per inch, and one hour later it is 30.5 lenses per inch, the image would preferably be made to this pitch and printed on, or laminated to the soap at that time. Asymmetries in shrinkage may also be predicted, such as a slightly faster shrinkage rate toward the outer edges of a lens array, and the image may altered accordingly.

While embodiments of the invention are disclosed as examples of how to make and use the invention, the invention is not limited to these embodiments as variations will be apparent to those skilled in the art. The scope of the invention is defined by way of the claims.

What is claimed is:

1. A bar of soap containing a visual image, comprising:
   a bar of solid soap material, the material being at least partially transparent to permit transmission of light;
   a lens formed in and by the soap material; and
   an image formed in the soap material, the lens and image arranged so that the image can be seen through the lens from a vantage point external to the bar of soap material, wherein the image appears to change in content as the vantage point changes relative to the bar of soap.

2. The bar of soap according to claim 1, wherein the lens comprises a lenticular lens.

3. The bar of soap according to claim 1, where the lens comprises an array of lenses.

4. The soap bar according to claim 3, wherein a volume of space between the lenses in the array is one of empty space, filled with soap or an object.

5. The soap bar according to claim 3, wherein the lens is a lens array which has a thickness and a focal point, and wherein the thickness is greater than its focal length, wherein the lens side of the array faces inward, separated from the image by an empty space the width of the focal distance of the lenses, so as to allow viewing from the outside, with an equal thickness of soap to the sides and behind the image such that the whole bar may be used without destroying the image until a large portion of soap is consumed.

6. The bar of soap according to claim 1, wherein the image is printed using food-safe ink.

7. The bar of soap according to claim 1, wherein the image is printed on a dissolvable non-toxic substrate with food-safe ink.

8. The bar of soap according to claim 1, wherein the lens has a lens side facing an outside surface of the bar, and an opposite lens side at a focal plane of the lens.

9. The bar of soap according to claim 8, wherein the opposite lens side has an image printed directly thereon.

10. The bar of soap according to claim 8, wherein the opposite lens side is in contact with a substrate having an image printed thereon.

11. The soap bar according to claim 8, wherein the lens side is separated by an empty space from a thickness of soap to allow viewing the image, and an equal thickness of soap behind and to the sides of the image, whereby the bar may be used without destroying the image until the large portion of soap is consumed.

12. The soap bar according to claim 8 wherein the lens is double-sided, having a double-sided image between two opposing arrays, each with an empty space separating it from thicknesses of soap on either side to allow viewing from opposite sides.

13. The bar of soap according to claim 1, wherein the image is printed by one of inkjet, silk screen and lithography.

14. The bar of soap according to claim 1, wherein the image is created by projecting an image through the lens.

15. The bar of soap according to claim 14, wherein the image is double-sided, having a double-sided image between two opposing arrays of lenses.

16. The bar of soap according to claim 1, wherein the image is projected onto a food-safe photo-sensitive layer at a focal plane of the lens.

17. The soap bar according to claim 1, wherein the lens comprises a multi-faceted lens, and wherein the image is multi-faceted.

* * * * *